(12) United States Patent
Lee et al.

(10) Patent No.: US 9,763,537 B2
(45) Date of Patent: Sep. 19, 2017

(54) HOT BEVERAGE MAKER

(71) Applicant: Helen of Troy Limited, Belleville, St. Michael (BB)

(72) Inventors: Alex Lee, New York, NY (US); Davin Stowell, New York, NY (US); Joern Vicari, New York, NY (US); Anthony Vipan Torris, New York, NY (US); Richard Besen, San Francisco, CA (US)

(73) Assignee: Helen of Troy Limited, Belleville, St. Michael (BB)

( * ) Notice: Subject to any disclaimer, the term of this patent is extended or adjusted under 35 U.S.C. 154(b) by 429 days.

(21) Appl. No.: 14/525,572

(22) Filed: Oct. 28, 2014

(65) Prior Publication Data

US 2015/0132458 A1 May 14, 2015

Related U.S. Application Data

(60) Provisional application No. 61/901,717, filed on Nov. 8, 2013.

(51) Int. Cl.
*A47J 31/46* (2006.01)
*A23F 5/26* (2006.01)

(52) U.S. Cl.
CPC .......... *A47J 31/46* (2013.01); *A23F 5/262* (2013.01); *A47J 31/465* (2013.01)

(58) Field of Classification Search
CPC ........ A47J 31/46; A47J 31/465; A47J 31/462; A23F 5/262
USPC ...................................... 99/307, 306, 302 R
See application file for complete search history.

(56) References Cited

U.S. PATENT DOCUMENTS

| 2,245,389 | A | * | 6/1941 | Cremer | A47J 31/44 |
| | | | | | 99/305 |
| 2,268,633 | A | | 1/1942 | Aske | |
| 2,269,111 | A | * | 1/1942 | Jepson | A47J 31/0576 |
| | | | | | 219/441 |

(Continued)

FOREIGN PATENT DOCUMENTS

GB        1228334       4/1971

OTHER PUBLICATIONS

International Search Report filed in PCT/US2014/062542 mailed Mar. 30, 2015.

*Primary Examiner* — Christopher Kim
(74) *Attorney, Agent, or Firm* — Rankin, Hill & Clark LLP

(57) ABSTRACT

A hot beverage maker includes a pump, a kettle, a pumped fluid conduit, and a brew basket assembly. The kettle includes a reservoir, a heating element in the kettle for heating water in the reservoir, a spout for pouring water from the reservoir, and a pump inlet opening for providing heated water from the reservoir to the pump inlet. The pumped fluid conduit is connected with the pump outlet and includes a pumped fluid outlet. The brew basket assembly includes a pumped fluid outlet receptacle and a brew basket. The reservoir is selectively fluidly connectable with the brew basket via the pump inlet opening in the kettle being selectively fluidly connected with the pump inlet or the pumped fluid conduit outlet being selectively fluidly connectable with the pumped fluid outlet receptacle to selectively provide heated water from the reservoir to the brew basket.

18 Claims, 12 Drawing Sheets

(56) References Cited

U.S. PATENT DOCUMENTS

| | | | | |
|---|---|---|---|---|
| 3,570,390 | A * | 3/1971 | Jordan | A47J 31/545 |
| | | | | 99/282 |
| 4,793,246 | A * | 12/1988 | Barradas | A47J 31/057 |
| | | | | 99/279 |
| 4,888,466 | A * | 12/1989 | Hoffmann | A47J 31/56 |
| | | | | 219/433 |
| 4,900,886 | A * | 2/1990 | Bridges | A47G 19/12 |
| | | | | 219/689 |
| 4,967,648 | A | 11/1990 | Helbling | |
| 5,063,836 | A * | 11/1991 | Patel | A47J 31/56 |
| | | | | 99/281 |
| 5,964,143 | A * | 10/1999 | Driscoll | A47J 27/21191 |
| | | | | 99/299 |
| 6,279,458 | B1 * | 8/2001 | Sham | A47J 31/0573 |
| | | | | 99/281 |
| 6,857,351 | B2 * | 2/2005 | Cutter | A47J 31/54 |
| | | | | 99/279 |
| 8,075,935 | B2 | 12/2011 | Kreutzer Orent et al. | |
| 2004/0178131 | A1 | 9/2004 | Monteiro | |
| 2004/0226452 | A1 | 11/2004 | Lyall, III | |
| 2006/0266223 | A1 | 11/2006 | Hammad | |
| 2012/0199008 | A1 | 8/2012 | White et al. | |
| 2013/0087049 | A1 | 4/2013 | White | |

* cited by examiner

HOT BEVERAGE MAKER

BACKGROUND

Coffee makers exist that can consecutively brew a single pot of coffee at a time or multiple pots if continuously refilled. Some coffee makers can brew less than one pot, but to do so it requires the user to fill the water reservoir with a desired volume of water that corresponds precisely to the amount of brewed coffee.

There are also many coffee makers that also allow the user to make tea. These combination—type appliances typically include one hot water reservoir for making coffee and another separate hot water reservoir for making tea. These two separate reservoirs result in a larger appliance.

SUMMARY

In view of the foregoing, a hot beverage maker includes a pump, a kettle, a pumped fluid conduit, and a brew basket assembly. The pump includes a pump inlet and a pump outlet. The kettle includes a reservoir, a heating element in the kettle for heating water in the reservoir, a spout for pouring water from the reservoir, and a pump inlet opening for providing heated water from the reservoir to the pump inlet. The pumped fluid conduit is connected with the pump outlet and includes a pumped fluid outlet. The brew basket assembly includes a pumped fluid outlet receptacle and a brew basket. The reservoir is selectively fluidly connectable with the brew basket via the pump inlet opening in the kettle being selectively fluidly connected with the pump inlet or the pumped fluid conduit outlet being selectively fluidly connectable with the pumped fluid outlet receptacle to selectively provide heated water from the reservoir to the brew basket.

An example of a method for brewing coffee includes measuring an initial volume of water in a reservoir, displaying a volume of coffee capable of being brewed based on the initial volume, and receiving a desired volume of coffee to be brewed. The desired volume of coffee to the brewed is less than or equal to the volume of coffee capable of being brewed. The method further includes heating the water in the reservoir, pumping heated water from the reservoir to a brew basket, measuring a volume of heated water remaining in the reservoir, and stopping the pumping of the heated water from the reservoir when the difference between the initial volume of water and the volume of heated water remaining in the reservoir equals the desired volume of coffee to be brewed.

Another example of a method for brewing coffee includes heating water in a reservoir to a first target temperature. After the water in the reservoir has been heated to the first target temperature, the heated water is pumped from the reservoir to a brew basket for a predetermined amount of time. After the predetermined amount of time has elapsed, power is controlled to a heating element to heat the water remaining in the reservoir to a second target temperature, which is lower than the first target temperature. Also after the predetermined amount of time has elapsed, the heated water remaining in the reservoir is pumped from the reservoir to the brew basket.

A method of determining a status of a hot beverage maker includes measuring a first volume of water in a reservoir. The method further includes pumping water from the reservoir to a brew basket. After pumping the water for a predetermined amount of time, a second volume of water remaining in the reservoir is measured. The method further includes determining a flow rate based on a difference between the first volume of water and the second volume of water and the predetermined amount of time. The determined flow rate is then compared to a stored pump flow rate or to a stored pump flow rate range. The method further includes generating a status signal when the determined flow rate is different than the stored pump flow rate or outside of the stored pump flow rate range.

DETAILED DESCRIPTION

Figure 1:
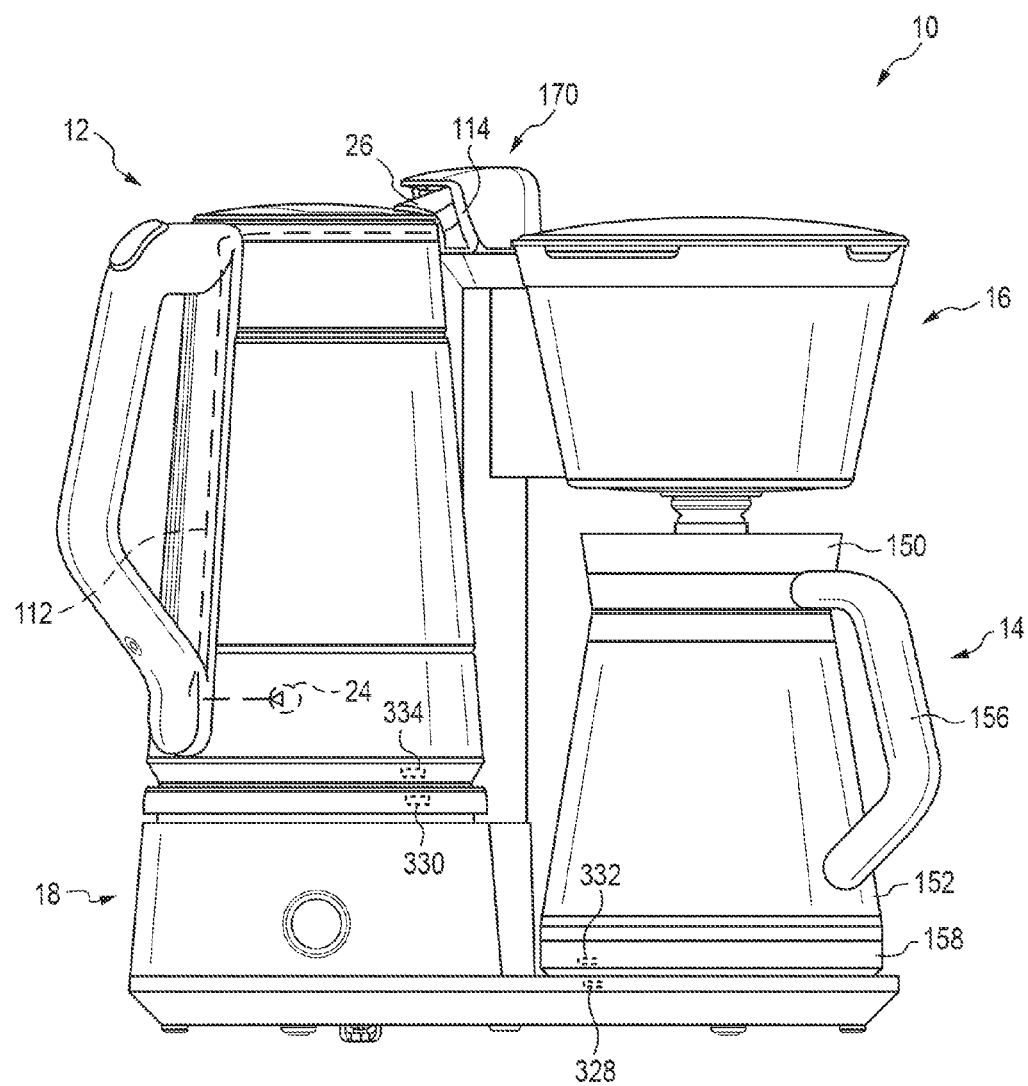
FIG. 1 is a front view of a hot beverage maker that includes a kettle, a carafe, a brew basket assembly, and a base.
Figure 2:
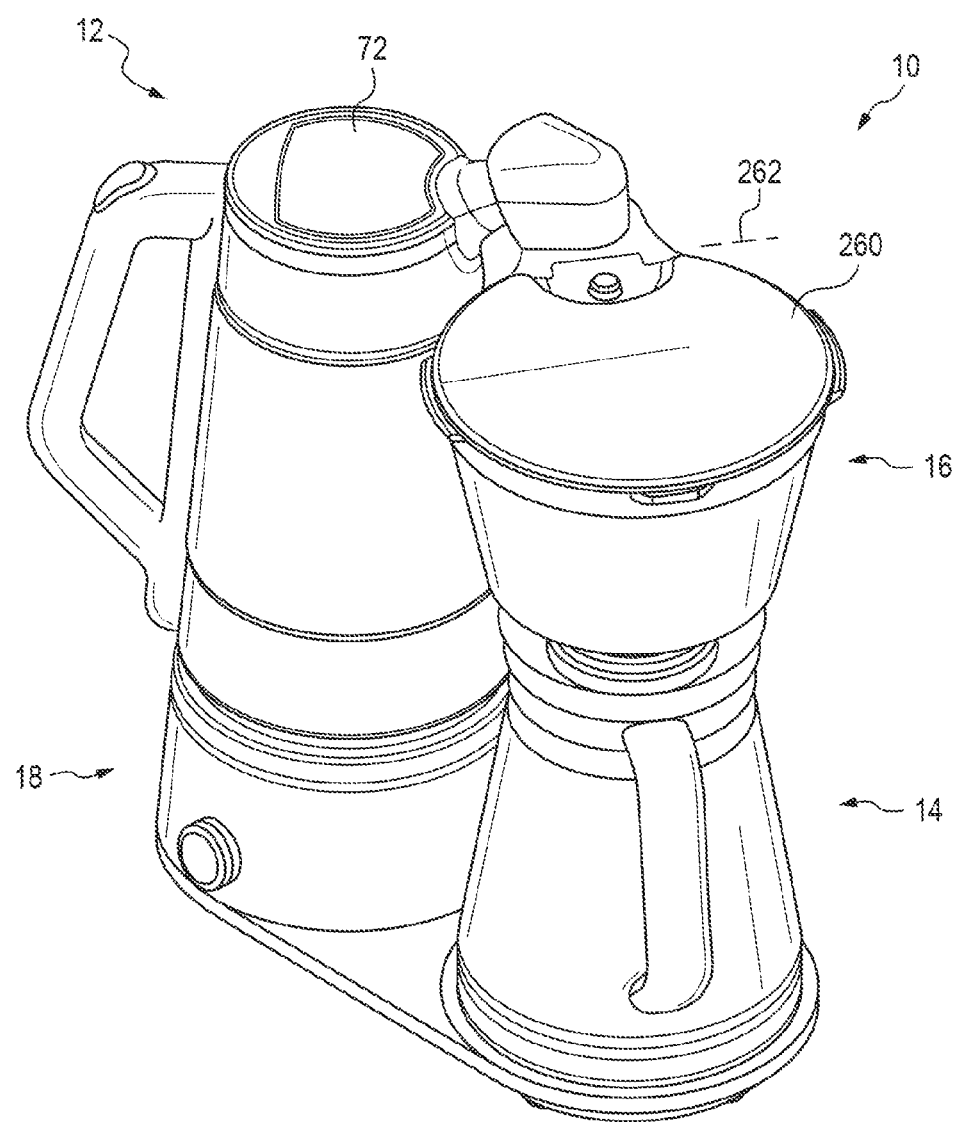
FIG. 2 is a perspective view of the hot beverage maker depicted in FIG. 1.

FIGS. 1 and 2 depict a hot beverage maker 10 including a kettle 12, a carafe 14, a brew basket assembly 16, and a base 18. The hot beverage maker 10 is useful to heat water in the kettle 12 to make tea, for example. Heated water from the kettle 12 can also pass through the brew basket assembly 16 to prepare brewed coffee in the carafe 14. As will be described in more detail below, an operator of the hot beverage maker 10 can control how much available water in the kettle 12 will be allocated to coffee and how much hot water will remain, which can be used for other purposes such as making tea, other hot beverages or foods such as soup and oatmeal.

Figure 3:
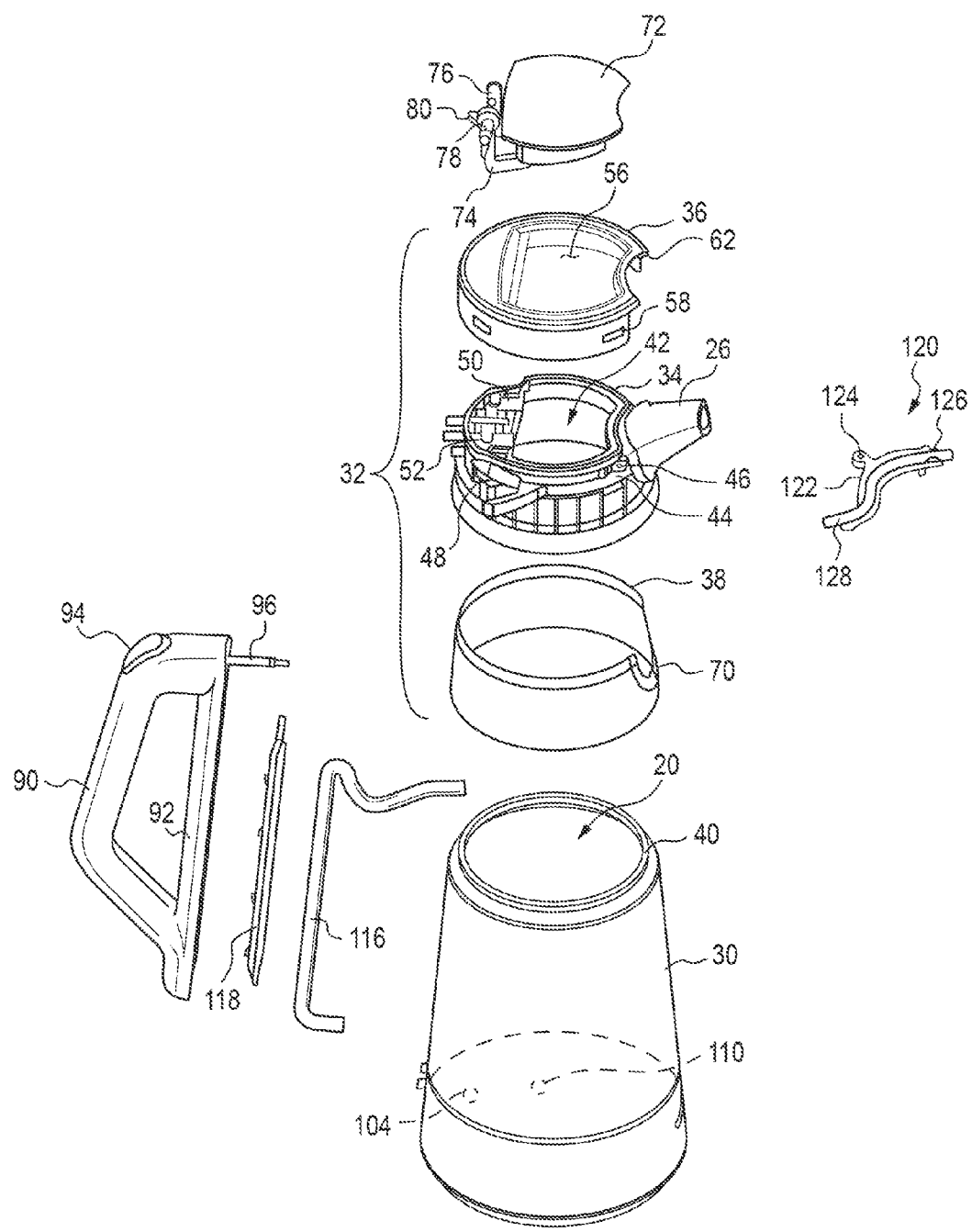
FIG. 3 is a partially exploded view of the kettle of the hot beverage maker depicted in FIGS. 1 and 2.
Figure 4:
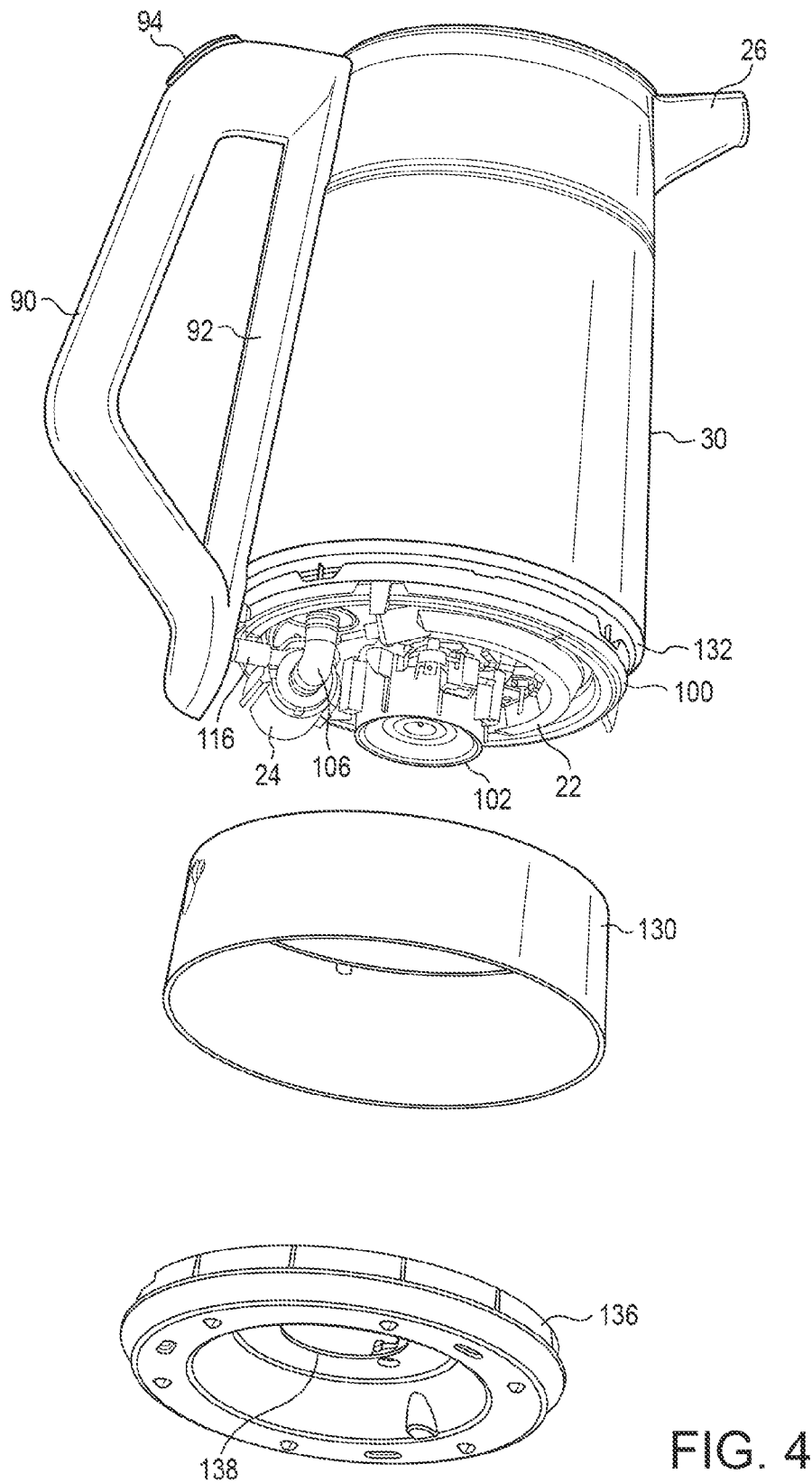
FIG. 4 is a partially exploded view of the kettle of the hot beverage maker depicted in FIGS. 1 and 2.

With reference to FIGS. 3 and 4, the kettle 12 includes a reservoir 20, a heating element 22 in the kettle for heating water in the reservoir 20, a pump 24 for pumping hot water from the reservoir 20, and a spout 26 for pouring water from the reservoir. The pump 24, which includes a pump inlet and a pump outlet (both of which are not visible in FIG. 4), is disposed in the kettle 12; however, the pump 24 could be located in the base 18. The kettle 12 further includes a reservoir sidewall 30 that defines the sides of the reservoir 20. The reservoir sidewall 30 can be made from glass and can be insulated. The reservoir sidewall 30 is shown as generally cylindrical; however, the reservoir sidewall 30 can take other configurations.

With reference to FIG. 3, a cap 32, which in the illustrated embodiment is an assembly including a mouth 34, a top ring 36 and a cover 38 and is generally annular in configuration, is fixed to an upper edge 40 of the reservoir sidewall 30. The mouth 34 defines a passage 42 that leads from ambient to the reservoir 20. The mouth 34 also includes the spout 26 of the kettle 12 which is in fluid communication with the reservoir 20. The mouth 34 also includes a shelf 44 positioned outside of the passage 42. An end of the shelf 44 is disposed beneath and adjacent to a hole 46 found adjacent an upstream end of the spout 26. Tabs 48 extend outwardly from the shelf 44. The mouth 34 also includes a lid actuator mount 50, which includes aligned U-shaped recesses 52.

The top ring 36 connects with the mouth 34. The top ring 36 is generally annular in configuration and defines an upper opening 56 of the kettle 12, which leads to the reservoir 20. The top ring 36 includes tab openings 58 that receive the tabs 48 on the mouth 34 to connect the top ring 36 with the mouth 34. The top ring 36 also includes a recess 62 that receives the spout 26.

The mouth cover 38, which is generally annular in configuration, surrounds the mouth 34 and a lower portion of the top ring 36. The mouth cover 38 includes a recess 70 through which the spout 26 extends.

A lid 72 selectively covers the upper opening 56 in the top ring 36 to close the reservoir 20 from ambient. With reference to FIG. 3, arms 74 connect the lid 72 with axles 76, which are received in the recesses 52 formed in the lid actuator mount 50 of the mouth 34. Springs 78 bias the lid 72 toward an open position. A catch 80 is provided between the axles 76.

The kettle 12 also includes a handle 90, which can be hollow. The handle 90 includes a spine 92 that is positioned next to the reservoir sidewall 30 and defines an enclosed space next to the reservoir sidewall 30. A button 94 attaches to the handle 90. The handle 90 connects with the mouth 34 at the lid actuator mount 50 via fasteners (not shown). The button 94 connects with a moveable link 96, which is receivable in the lid actuator mount 50 to engage the catch 80. An operator depresses the button 94, which moves the actuator link 96 away from the catch 80. The springs 78 bias the lid, which results in pivotal movement of the lid 72 in the upward direction to open the lid 72, which allows water to be poured through the upper opening 56 in the top ring 36.

With reference to FIG. 4, the kettle 12 includes a reservoir base 100 that in combination with the reservoir sidewall 30 defines the reservoir 20. In the illustrated embodiment, the reservoir base 100 is made from metal to operate as a heating plate, which is in contact with the heating element 22. The heating element 22 is a resistive heating element that is in electrical communication with an electrical connector 102 that is connected with and extends downwardly from the reservoir base 100. With reference back to FIG. 3, a pump inlet opening 104, which is an opening formed in and extending through the reservoir base 100, connects with a pump inlet tube 106 (FIG. 4), which is connected with the pump 24 (see FIG. 4) at the pump inlet. In an alternative embodiment where the pump 24 is located in the base 18, the pump inlet opening 104 is in fluid communication with the pump for providing heated water from the reservoir 20 to the pump in a manner described in more detail below. The hot beverage maker 10 depicted in FIG. 1 includes a pumped fluid conduit 112 (depicted schematically in FIG. 1) connected with the pump outlet and including a pumped fluid outlet 114. FIG. 1 shows one example of a location for the pumped fluid conduit 112. Other locations for the pumped fluid conduit, such as the other locations described later, are available. With reference back to FIG. 3, the kettle 12 also includes a temperature sensor 110 positioned on the reservoir base 100. The temperature sensor 110 measures the temperature of the water in the reservoir 20 and is in electrical communication with the electrical connector 102.

With reference back to FIG. 3, the kettle 12 also includes a tube 116, which will be referred to as a main tube, that is connected with an outlet of the pump 24 (FIG. 4). In the illustrated embodiment, the main tube 116 passes between the spine 92 and the exterior reservoir sidewall 30. A tube cover 118 can connect with the side wall 30 to further cover the main tube 116. The main tube 116 is positioned between the tube cover 118 and the exterior of the reservoir side wall 30. An upper section of the main tube 116 extends along the shelf 44 and passes through or terminates near the hole 46 in the spout 26. In an alternative embodiment, the main tube 116 can pass through the hollow handle 90.

Figure 5:
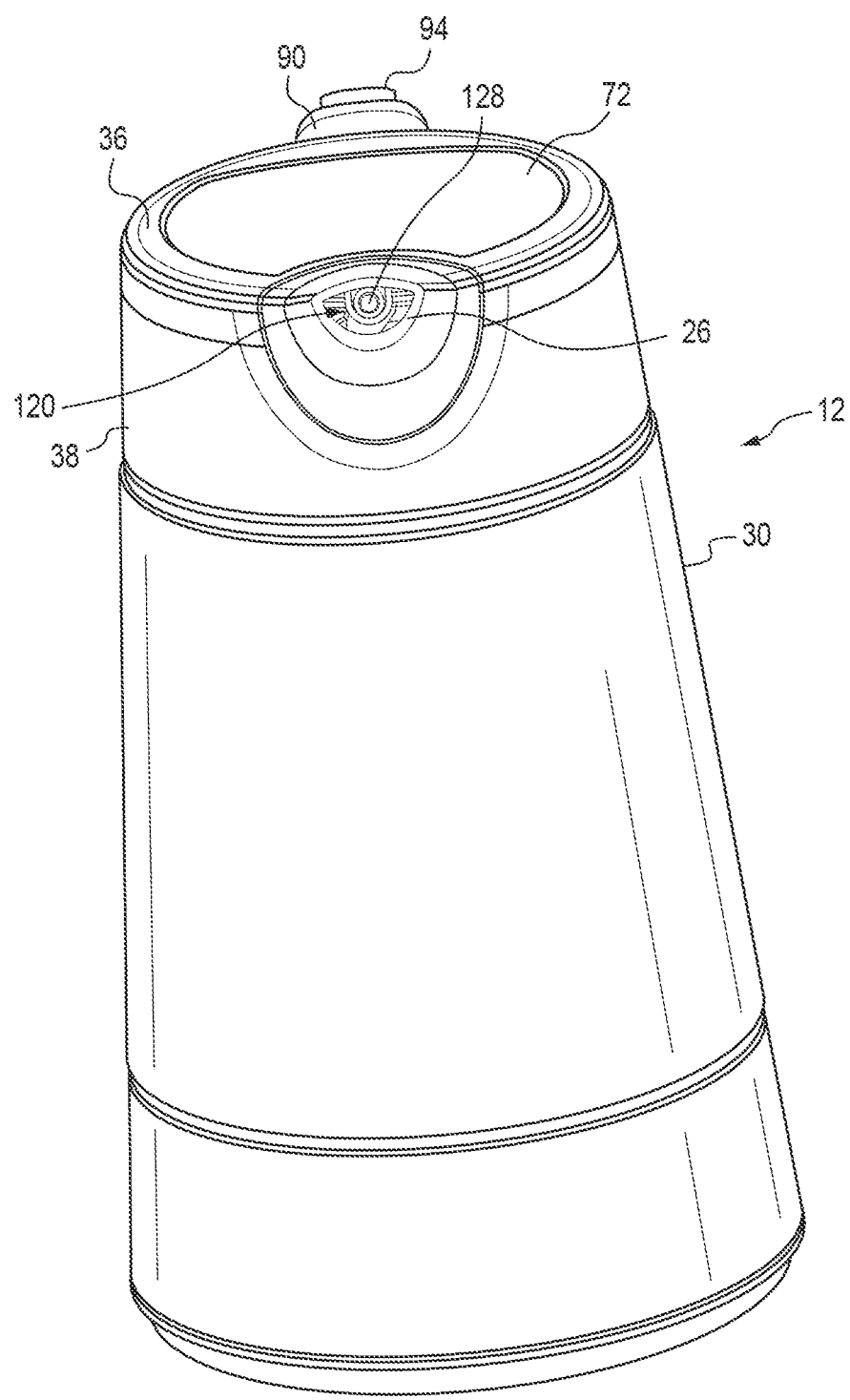
FIG. 5 is a perspective view of the kettle showing a pumped water outlet structure positioned in a spout of the kettle.

The main tube 116 connects with a pumped water outlet structure 120. As seen in FIG. 5, the pumped water outlet structure 120 can be positioned in the spout 26 of the kettle. The pumped water outlet structure 120 includes a bracket 122 having fastener openings 124 that receive fasteners (not shown) to connect the bracket 122 with the mouth 34. The bracket 122 includes a channel 126 that receives a hot water outlet tube 128 that connects with the main tube 116. An end section of the hot water outlet tube 128, which terminates at the pumped fluid outlet 114, can extend through the hole 46 and connect with the main tube 116. The pump 24, which is electrically connected with the electrical connector 102, pumps water from the reservoir 20 through the main tube 116 and out through the hot water outlet tube 128 of the pumped water outlet structure 120 to deliver water to the brew basket assembly 16 (FIG. 1). With reference to FIG. 5, the pumped water outlet structure 120 is positioned in the spout 26 such that water being poured from the kettle 12 through the spout 26 passes beneath or around the pumped water outlet structure when exiting the kettle 12 through the spout 26.

Figure 11:
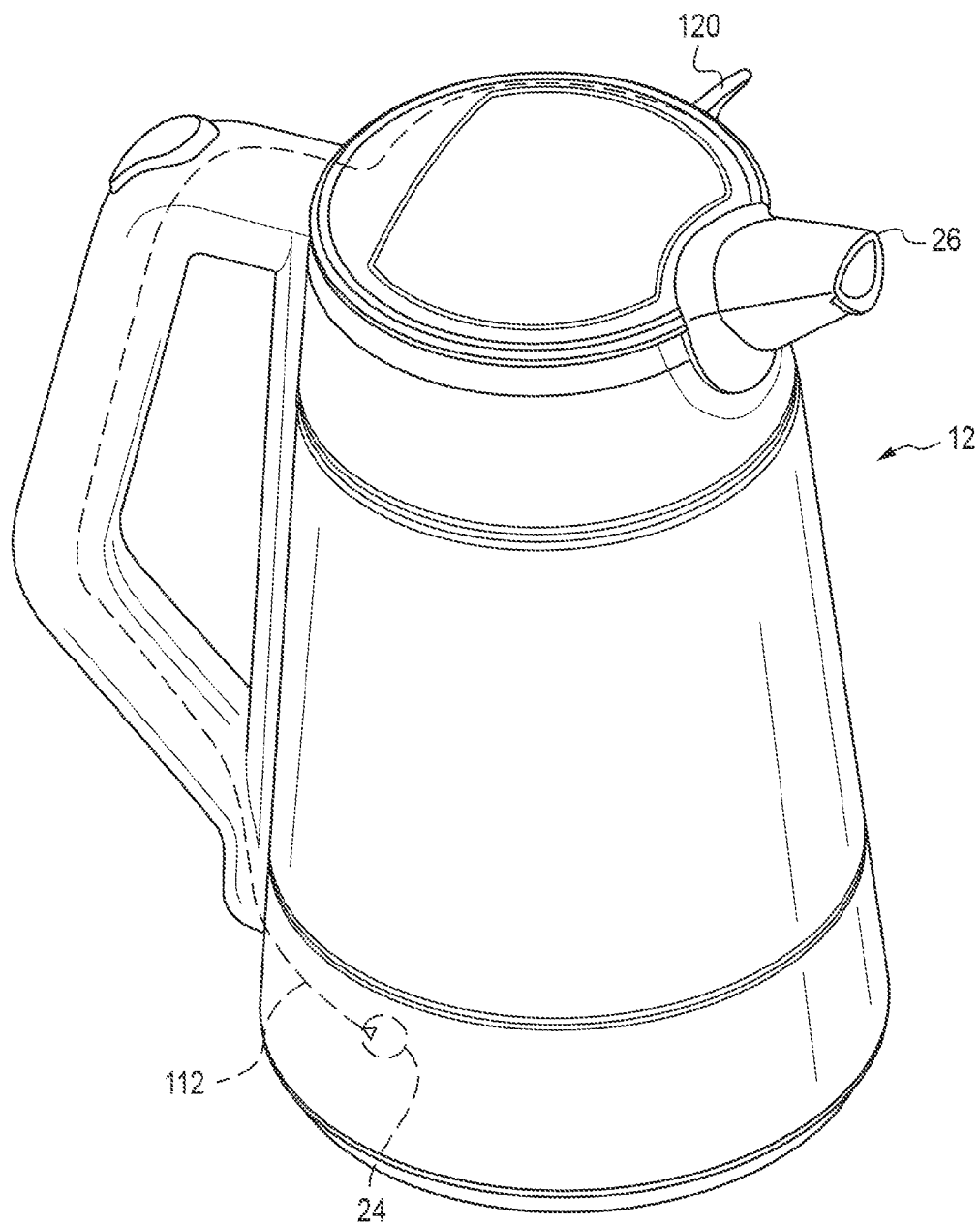
FIG. 11 is a perspective view of a kettle similar in all respects to the kettle depicted in FIG. 1 with the exception of the location of a pumped fluid conduit and a pumped fluid outlet.

In an alternative arrangement shown in FIG. 11, the kettle 12 includes the pumped water outlet structure 120 positioned offset from the spout 26. FIG. 11 also depicts an alternative location for the pumped fluid conduit 112, which extends through the handle 90. A main tube (not visible but similar to the main tube 116 depicted in FIG. 3) connects with or is supported by the pumped water outlet structure 120 in a manner similar to that shown in FIG. 3. However, the pumped water outlet structure 120 shown in FIG. 11 could take another configuration than that shown in FIG. 3. The pump 24 pumps water from the reservoir 20 through the main tube and out through the pumped water outlet structure 120 to deliver water to the brew basket assembly 16.

With reference back to FIG. 4, the kettle 12 includes a base sidewall 130, which is cylindrical in configuration. The base sidewall 130 abuts against a lower edge 132 of the reservoir sidewall 30 and against the reservoir base 100. A base outer cover, which can also cylindrical in configuration, can surround the base sidewall 130 and provide a more decorative outer shell for the kettle. A base floor 136 connects with the reservoir base 100 to enclose the heating element 22 and the pump 24. The base floor 136 includes an opening 138 through which the electrical connector 102 extends.

With reference back to FIG. 1, the carafe 14 can be similar to conventional carafes. The carafe includes a lid 150. The lid 150 can be removable from the main body 152 of the carafe. The lid 150 includes an inlet opening (not visible) through which brewed coffee from the brew basket assembly 16 enters a chamber (not visible) of the carafe 14. The carafe 14 also includes a handle 156. The handle 156 is connected with the main body 152 of the carafe 14. The carafe 14 can be made from a heat insulative material. The carafe 14 can also include a base 158, which can be made from a heat conductive material to allow the carafe 14 to be placed on a heating element to keep the contents in the reservoir 154 of the carafe 14 at a desired temperature. The carafe 14 could be replaced with other carafes or another type of receptacle, e.g. a coffee cup, to receive the brewed beverage.

Figure 6:
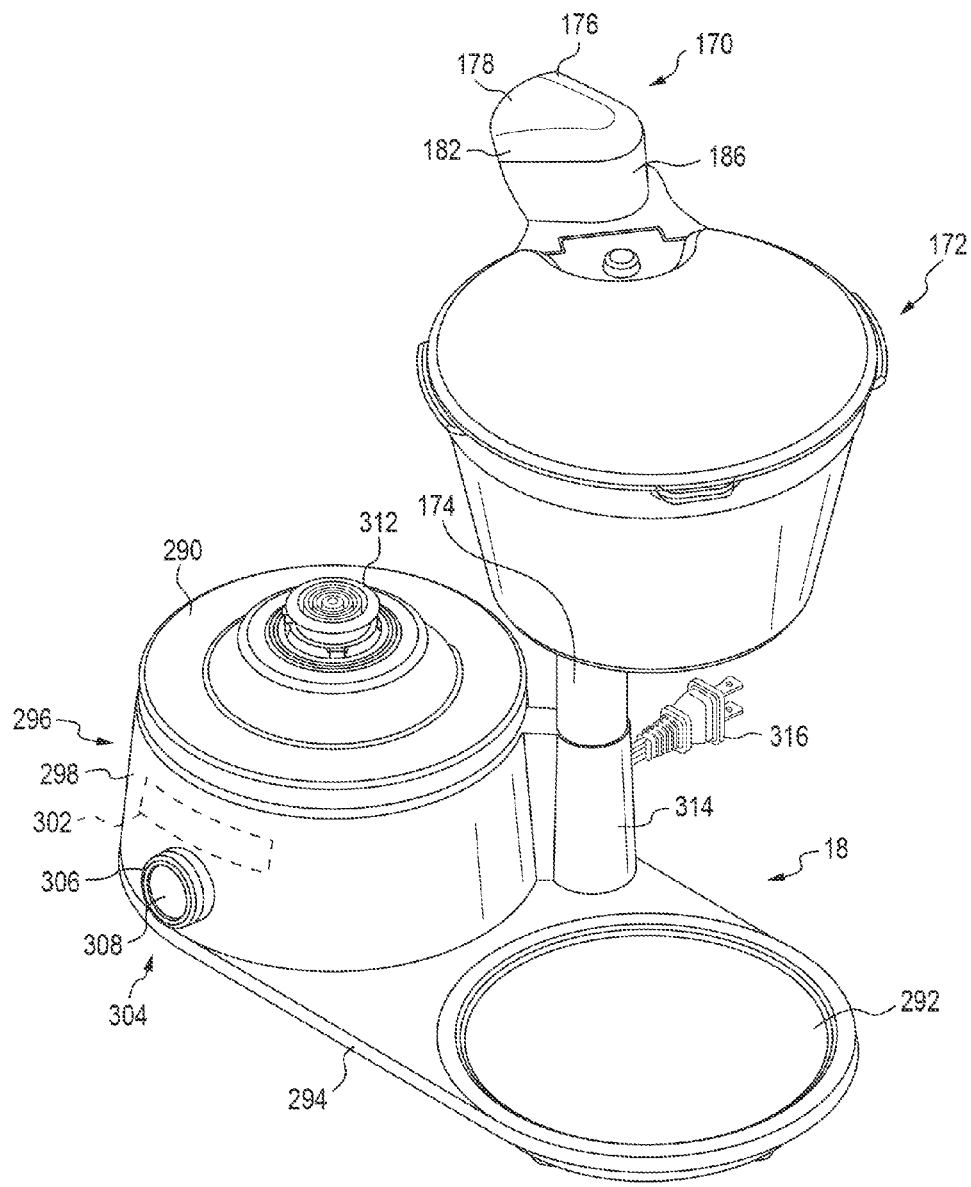
FIG. 6 is a perspective view of the base and the basket assembly of the hot beverage maker depicted in FIGS. 1 and 2.

With reference to FIG. 6, the brew basket assembly 16 includes a pumped fluid outlet receptacle 170, a brew basket 172, and a vertical support column 174, which is connected with the base 18. The pumped fluid outlet receptacle 170 includes a lid 176 having a substantially planar top 178 and a downwardly depending skirt 182. The pumped fluid outlet receptacle 170 also includes a lower section 186 that is similar in size and shape with the skirt 182 when viewed from above. With reference to FIG. 6, the lower section 186 of the pumped fluid outlet receptacle 170 also includes a floor 192 having a lower opening 194. The lid 176 pivotally connects with the lower section 186. The lid 176 pivots about a horizontal axis on an axle 196 in the direction of arrow 198 between a closed position (see FIG. 7) and an open position (not shown). With the lid 176 in the closed position, the pumped fluid outlet receptacle 170 defines a space 200 that can receive the spout 26 of the kettle 12, which is shown in FIG. 1, or the pumped water outlet structure 120 shown in FIG. 11. The pumped fluid outlet receptacle 170 includes an opening 202 through which the spout 26 or pumped water outlet structure 120 extends when received in the pumped fluid outlet receptacle 170. The pumped fluid outlet receptacle 170 also includes a movable flap 204 at least partially covering the opening 202 and connected with the lower section 186. The movable flap 204 is displaceable from an original position (shown in FIG. 8) when contacted by the spout 26 or pumped water outlet structure 120. The movable flap 204 can be made from a resilient material such as silicone. The movable flap 204 moves when contacted by the spout 26 or pumped water outlet structure 120, when the user rotates the kettle 12, and then returns to its original position when the spout 26 or pumped water outlet structure 120 no longer contacts the movable flap 204. This blocks the opening 202 and prevents steam from escaping during the brew cycle. In an alternative arrangement, the pumped fluid outlet receptacle 170 could rotate with respect to a vertical axis. A spring can connect with the lower section 186 to bias the pumped fluid outlet receptacle 170.

The brew basket assembly 16 also includes a connector 210 that connects the brew basket 172 with the vertical support column 174. Fastener openings 212 provided in bosses 214 are provided to receive fasteners (not shown) to connect the connector 210 with the vertical support column 174.

Figure 9:
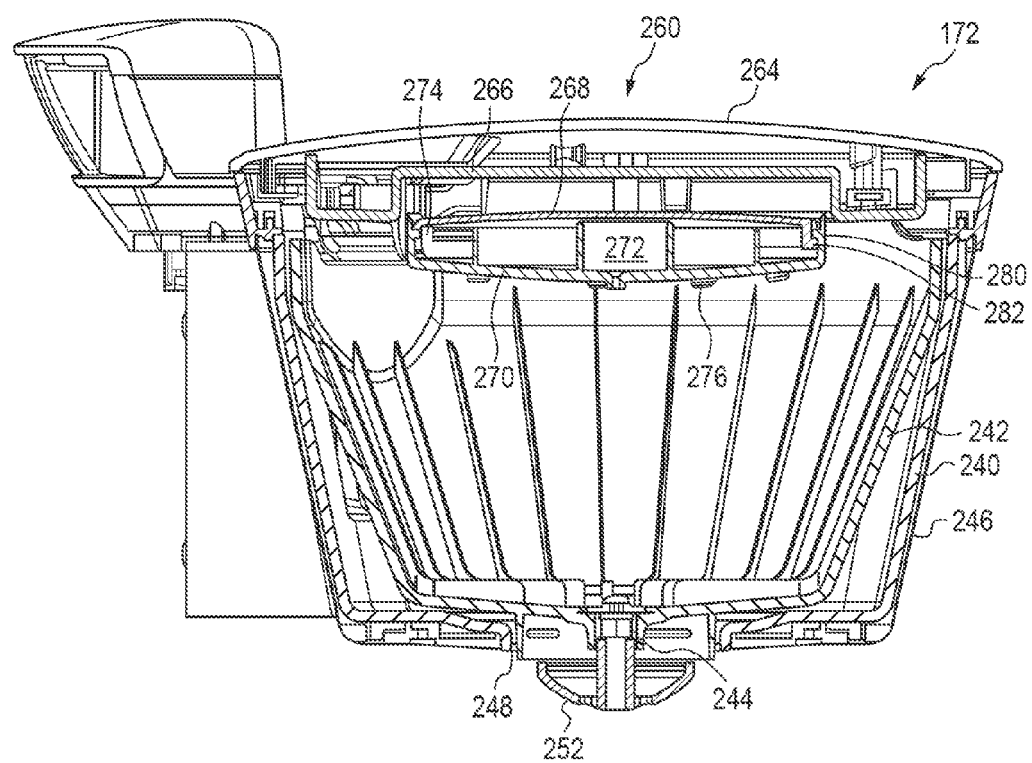
FIG. 9 is a cross-sectional view taken through the brew basket assembly shown in FIG. 7.

With reference to FIG. 9, the brew basket assembly 16 includes a filter basket support 240 that is generally cylindrical in shape and surrounds a filter basket 242, which is configured to receive a conventional coffee filter. The filter basket 242 includes an outlet opening 244 through a lower section. An outer decorative cover 246, which is generally cylindrical in configuration, surrounds the filter basket support 240. The filter basket support 240 includes a lower opening 248 that is concentric with and larger than the outlet opening 244 of the filter basket 242. An umbrella valve 252 connects with the filter basket 242 and is positioned within the outlet opening 244. The umbrella valve 252 selectively opens and closes the outlet opening 244 in the filter basket 242. An upward force on the umbrella valve 252, which occurs when the carafe 14 is appropriately positioned on the base 18 underneath the filter basket 242, pushes the umbrella valve 252 upward opening the outlet opening 244.

A lid assembly 260 is provided with the filter basket 242. The lid assembly 260 pivots about a horizontal axis 262 (FIG. 2). With reference to FIG. 9, the lid assembly 260 includes a cover 264 connected with a lid bottom 266. A shower head top 268 connects with the lid bottom 266 and a shower head bottom 270 connects with the shower head top 268. The shower head top 268 and the shower head bottom 270 define a chamber 272 between them. A shower head conduit 274 leads from the lower opening 194 in the space 200 defined by the pumped fluid outlet receptacle 170 to the chamber 272 defined by the shower head top 268 and the shower head bottom 270. The shower head bottom 270 includes a plurality of holes 276 through which heated water flows prior to landing on coffee grounds found in the filter basket 242. The shower head bottom 270 is removable from the lid assembly 260. Barbs 280 on the shower head bottom 270 are received in channels 282 in the shower head top 268 to provide a bayonet connection. The shower head bottom 270 can connect with the shower head top 268 in other conventional manners.

With reference back to FIG. 6, the base 18 includes a kettle support 290 for supporting the kettle 12 and a carafe support 292 for supporting the carafe 14. The base 18 also includes a platform 294 and a pedestal 296. The kettle support 290 is positioned on top of the pedestal 296 spaced from and elevated above the carafe support 292, which is formed as a recess in the platform 294. With the kettle 12 positioned on the kettle support 290 with the spout 26 (or the pumped water outlet structure 120 in FIG. 11) received in the pumped fluid outlet receptacle 170 and the carafe 14 positioned on the carafe support 292, a liquid path is provided from the reservoir 20 in the kettle 12 through the pump 24 (FIG. 4) and the spout 26 (or the pumped water outlet structure 120) of the kettle 12 into the brew basket 172 and through the brew basket 172 into the chamber 154 of the carafe 14.

The base 18 further includes a pedestal sidewall 298 surrounding electrical components, which will be described in more detail below. The kettle support 290 is movable with respect to the pedestal sidewall 298 in a vertical direction, which facilitates measuring a volume of water in the reservoir 20 (FIG. 3) of the kettle 12. A display 302 is provided on the pedestal sidewall 298 to provide information to an operator of the hot beverage maker 10. An input device 304, which in the illustrated embodiment includes a rotating knob 306 that surrounds a pushbutton 308, is provided to allow an operator to input commands. An electrical connector 312 extends upwardly from the kettle support 290 and is positioned to connect with the electrical connector 102 on the kettle 12 when the kettle 12 is placed on the kettle support 290. The base 18 further includes a column support 314 that connects with the vertical support column 174, which is connected to the brew basket assembly 16.

Figure 10:
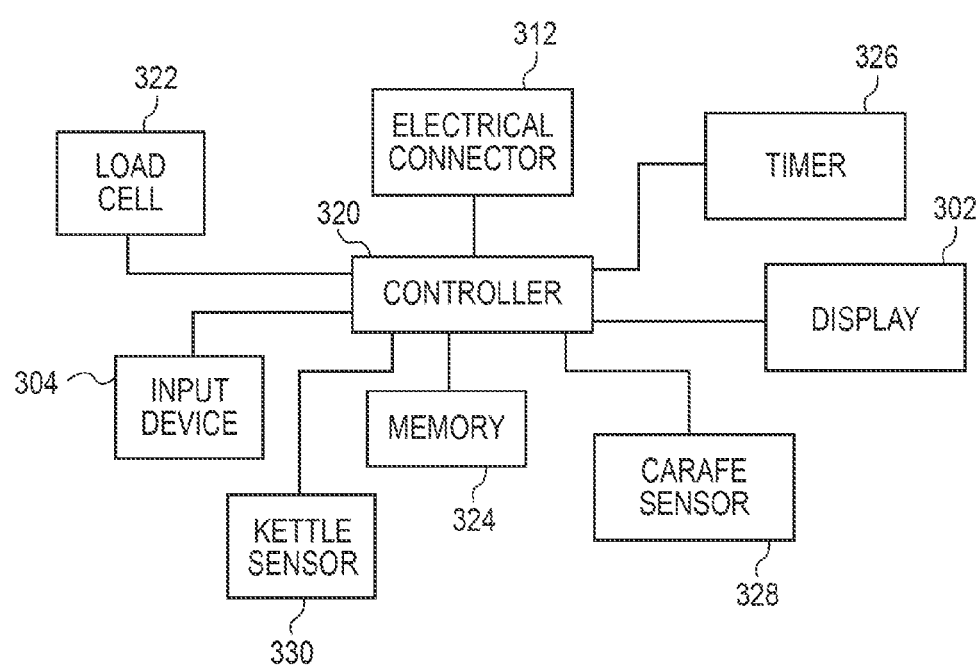
FIG. 10 is a schematic diagram of some electrical components of the hot beverage maker depicted in FIGS. 1 and 2.

With reference to FIG. 10, the hot beverage maker 10 includes a controller 320 disposed inside the base 18. The controller 320 can be made up of an integrated circuit on a circuit board, similar to known controllers of small appliances. The controller 320 is electrically connected to an AC plug 316 to receive power. The controller 320 is in electrical communication with the display 302 to control the contents of the display. The controller 320 is also in electrical communication with the input device 304 to receive input commands from an operator of the hot beverage maker 10. The controller 320 is also in electrical communication with the electrical connector 312 to control the delivery of power to the pump 24 and the heating element 22 (FIG. 4) of the kettle 12 and also to receive information signals from the temperature sensor 110 located in the kettle 12.

The controller 320 is also in electrical communication with a load cell 322. The load cell 322 is disposed beneath the kettle platform 290. The load cell 322 is configured to measure the weight or mass of the kettle 12, i.e., a force applied by the kettle 12 on the kettle platform 290. The load cell 322 can send this information via a signal to the controller 320, which can be in electrical communication with a memory 324 where the initial (dry) weight or mass of the kettle 12 can be stored.

The controller 320 can also be in electrical communication with a timer 326, a carafe sensor 328, and a kettle sensor 330. FIG. 1 schematically depicts the carafe sensor 328, which can cooperate with a magnet 332 located on the carafe 14 to sense whether the carafe 14 is properly positioned on the carafe support 292 so as to receive brewed coffee from the brew basket assembly 16. The carafe sensor 328 can be a reed switch that senses the magnet 332 on the carafe. Similarly, the kettle sensor 330 (schematically depicted in FIG. 1) can sense a magnet 334 (also schematically depicted in FIG. 1) to determine whether the kettle 12 is properly positioned on the kettle platform 290 in a manner such that the spout 26 is received in the pumped fluid outlet receptacle 170. For example, the kettle sensor 330, which can also be a reed switch, is located in the base 18 and the magnet 334 is located on the kettle 12 such that the reed switch is not activated until the kettle is positioned such that the spout 26 is located in the pumped fluid outlet receptacle 170. This ensures that water exiting the kettle 12 through the spout 26 is received in the pumped fluid outlet receptacle 170. The kettle sensor 330 and the controller 320 are configured such that if the spout 26 is not received in the pumped fluid outlet receptacle 170, because the kettle sensor 330 does not detect the magnet 332, then power is not delivered to the pump 24. Other types of known sensor arrangements can be employed to determine that the kettle 12 and the carafe 14 are properly located to preclude hot water from moving along an unintended path.

In operation, after an operator fills the reservoir 20 of the kettle 12 with water and places the kettle 12 on the kettle support 290, the load cell 322 operates to weigh or measure the mass of the kettle 12 and any water contained therein. Knowing the dry weight or mass of the kettle 12, which can be stored in the memory 324, the volume of water can be calculated by the controller 320. The volume of water can be displayed on the display 302, for example, as a number of cups that can be used toward either brewed coffee or hot water. The operator can control how much of the available water will be allocated to coffee and how much of the available water will be allocated to hot water. The input device 304 can be used to input these commands. The water in the reservoir 20 of the kettle 12 is then heated by the heating element 22, which receives power from the electrical connector 102 on the kettle 12 and the electrical connector 312, which is connected with a power source through the plug 316. The temperature sensor 110 can take temperature measurements of the water within the reservoir 20 of the kettle 12 and send signals to the controller 320 by way of the electrical connector 102 on the kettle 12 and the electrical connector 312 on the base 18. The heating element 22 cycles ON and OFF based on commands received from the controller 320.

The controller 320 can be configured (e.g., programmed) to control power to the heating element 22 to heat the water in the reservoir 20 of the kettle 12 to a target temperature, which can be measured by the temperature sensor 110. The target temperature can be changed at any time by the controller 320 by changing the amount and/or duration of power being delivered to the heating element 22. For example, the controller 320 can be programmed to control the pump 24 to begin pumping heated water from the reservoir 20 when the temperature sensor 110 measures that the water temperature in the reservoir 20 has reached a first target temperature, e.g., 98° C. This relatively higher target temperature is desirable because the components making up the pumped fluid conduit 112 may be at room temperature and will cool the water before the water travels to the coffee grounds in the brew basket assembly 16. After a predetermined amount of time, e.g. about one minute, which can be measured by the timer 326, the components making up the pumped fluid conduit 112 will be relatively warmer and there will be less heat lost from the water en route to the brew basket assembly 16. If the components making up the pumped fluid conduit 112 are too warm, however, the water that reaches the brew basket assembly 16 may be too hot. To avoid scalding the coffee grounds, the controller 320 can control the power being delivered to the heating element 22 so the target temperature can be changed. After the predetermined amount of time has elapsed, the target temperature can be lowered to a second target temperature, e.g., 95° C., for the rest of the pump cycle.

An example of a method of making coffee using the hot beverage maker 10 includes measuring an initial volume of water in a reservoir. The reservoir can be in a kettle, such as the reservoir 20 of the kettle 12; however, the reservoir need not be in such a kettle having a spout. For example, the reservoir could be a reservoir without a spout capable of holding at least about 1 liter or 2 liters of water connected with another type of outlet mechanism, e.g., a faucet, to deliver hot water to an operator. The initial volume of water can be measured using the load cell 322 in communication with the controller 320 by weighing the kettle. The volume of water in the reservoir can also be measured using a water level sensor in the kettle 12. For example, a float could cooperate with a potentiometer on a sidewall of the kettle, and knowing the dimensions of the reservoir, the volume of water in the reservoir can be determined. Other known water level sensors can be employed. The method of making coffee further includes displaying a volume of coffee capable of being brewed based on the initial volume, e.g., the number of cups available for brewing can be displayed on the display 302. The method further includes receiving a desired volume of coffee to be brewed, which is less than or equal to the volume of coffee capable of being brewed. For example, if the reservoir 20 of the kettle 12 has an initial volume of 10 cups of water, six cups of water can be brewed as coffee and the remaining (four cups of water) will remain in the kettle 12 as hot water. The timer 326 can measure the initial time at which the heating element 22 was turned ON and limit the amount of time that electricity is being delivered to the heating element 22. The method further includes heating the water in the reservoir 20 and pumping the heated water from the reservoir 20 to the brew basket 172. The method further includes measuring a volume of heated water remaining in the reservoir 20 the kettle 12. While water is being pumped from the reservoir 20 through the tube 116, which can be positioned in the handle 90 or between the spine 92 and the reservoir sidewall 30, and through the spout 26 of the kettle 12, the load cell 322 continues to weigh the kettle. The pump 24 stops pumping the heated water from the reservoir 20 when the difference between the initial volume of water and the volume of heated water remaining in the reservoir 20 equals the desired volume of coffee to be brewed.

Figure 7:
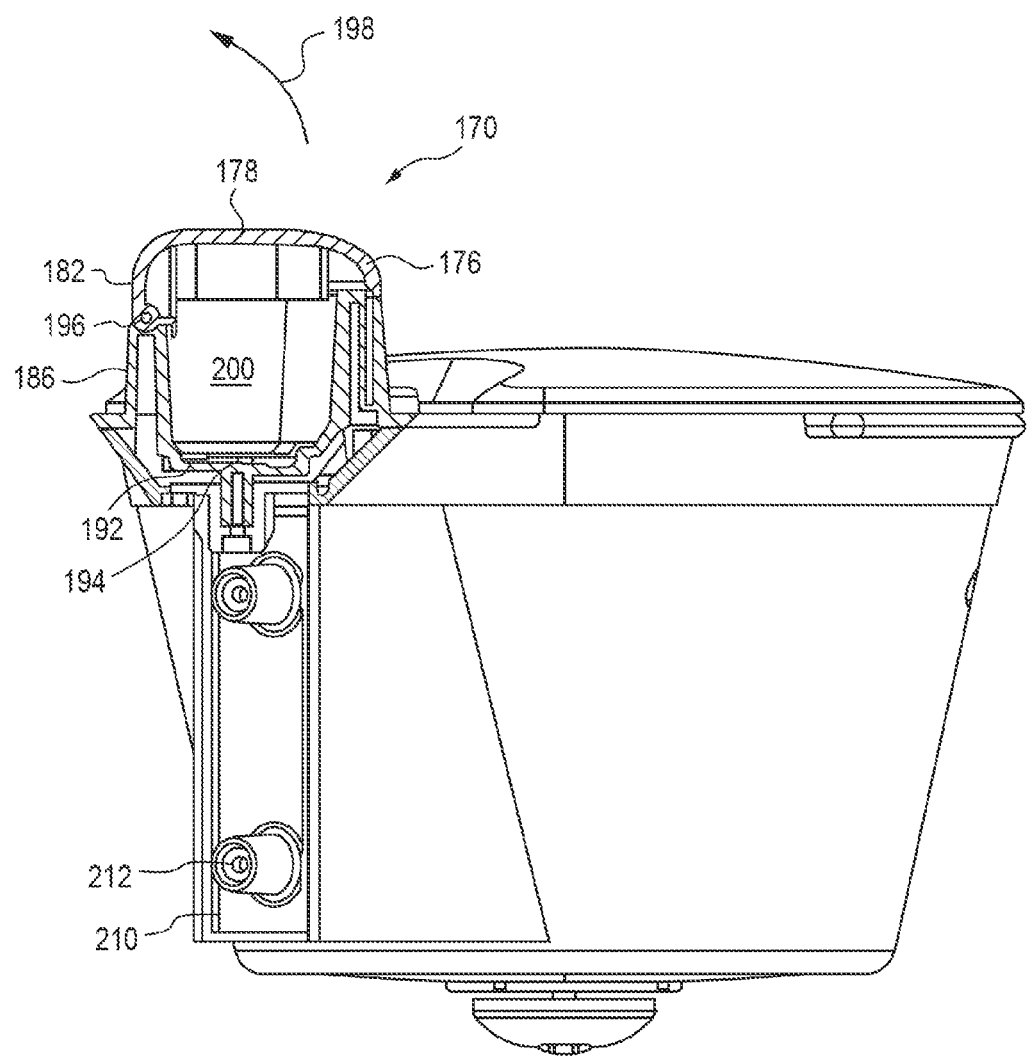
FIG. 7 is a cross-sectional view taken through a pumped fluid outlet receptacle of the brew basket assembly for the hot beverage maker depicted in FIGS. 1 and 2.
Figure 8:
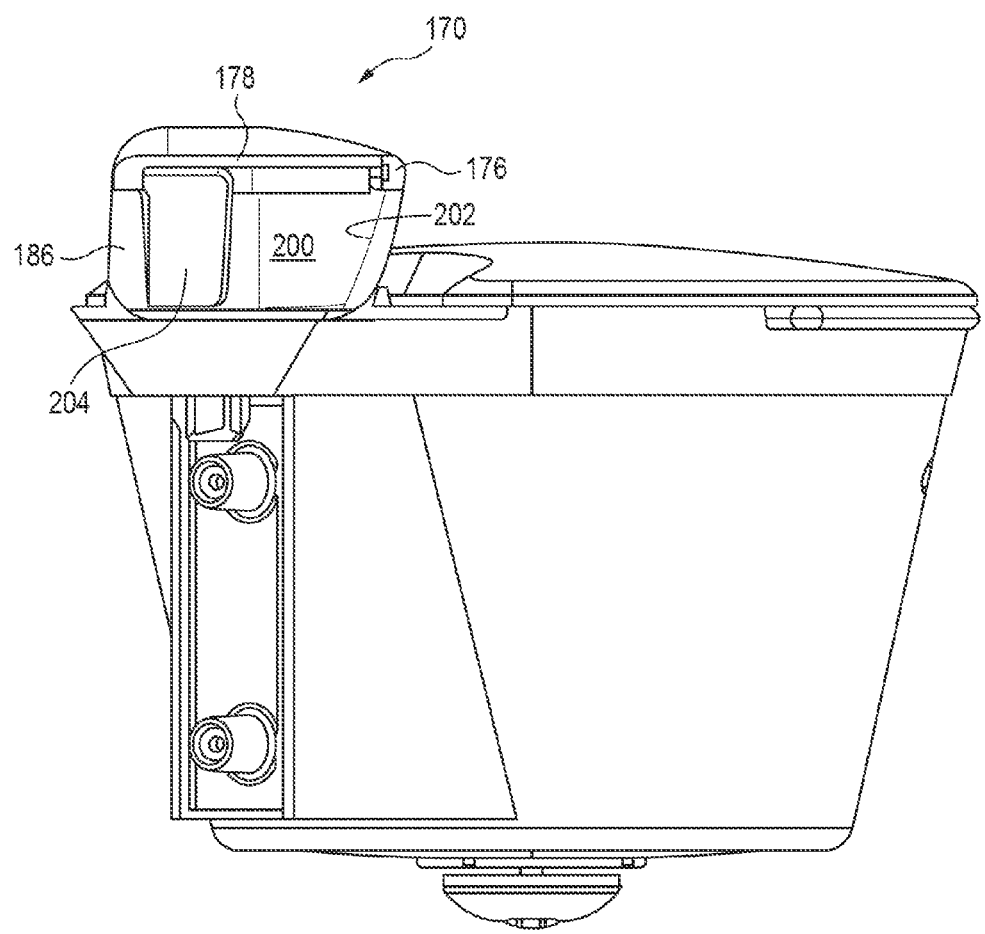
FIG. 8 is a side view similar to FIG. 7 of the brew basket assembly, but not in cross section.

The carafe sensor 328, which can be positioned below the carafe support 292, senses whether the carafe 14 is properly positioned on the carafe support 292, i.e., below the brew basket assembly 16 so as to displace the umbrella valve 252 (FIG. 7). The carafe sensor 328, which is in electrical communication with the controller 320, can send signals to the controller 320 to control the pump 24. For example, the pump 24 can stop operation when it is determined that the carafe 14 is not on the carafe support 292 in a position to displace the umbrella valve 252. Also, the kettle sensor 330 can send signals to the controller 320. If the kettle sensor 330 detects that the kettle 12 is positioned in a manner that the spout 26 (or the pumped water outlet structure 120 in FIG. 11) is not received in the pumped fluid outlet receptacle 170, e.g., the kettle sensor (reed switch) 330 does not detect the magnet 334 on the kettle 12, then the kettle sensor 330 sends a signal to the controller 320 and the controller 320 sends an OFF signal to the pump 26.

The status of the hot beverage maker 10 can also be determined and monitored to provide the operator an indication that the hot beverage maker may need cleaning. A method of determining a status of the hot beverage maker includes measuring a first volume of water in a reservoir, which can be the reservoir 20 in the kettle 12 or another reservoir, e.g., a reservoir without a spout capable of holding at least about 1 liter or 2 liters of water. The method also includes pumping water, through the pump 24, for example, from the reservoir to a brew basket, such as the brew basket 172. After pumping the water for a predetermined amount of time, a second volume of water remaining in the reservoir is measured. The timer 326 in communication with the controller 320 can measure the predetermined amount of time. Each volume of water can be measured using the load cell 322 similar to the method disclosed above, or another type of water level sensor (described above) can be used. Next, a flow rate is determined based on a difference between the first volume of water and the second volume of water and the predetermined amount of time. The flow rate can be volume as compared to time, e.g., ml/s. The controller 320 can be configured (e.g., programmed) to determine the flow rate. The controller 320 can also be configured (e.g., programmed) to compare the determined flow rate to a stored pump flow rate or to a stored pump flow rate range, which can be stored in the memory 324. The stored pump flow rate or the stored pump flow rate range can be based on the specifications of the pump 24. For example, the pump 24 can be configured or designed to operate at a particular pump flow rate or within a particular pump flow rate range. These values can be stored in the memory 324. A status signal can be generated by the controller 320 when the determined flow rate is different than the stored pump flow rate or outside of the stored pump flow rate range. For example, if deposits form along the fluid lines between the reservoir and the brew basket, then the pump may not operate at its particular pump flow rate or within its particular pump flow rate range. If this is the case, then the controller can generate a signal to provide an indication on the display 302 (or an audible signal) to alert the operator and provide an indication that the hot beverage maker needs cleaning.

Figure 12:
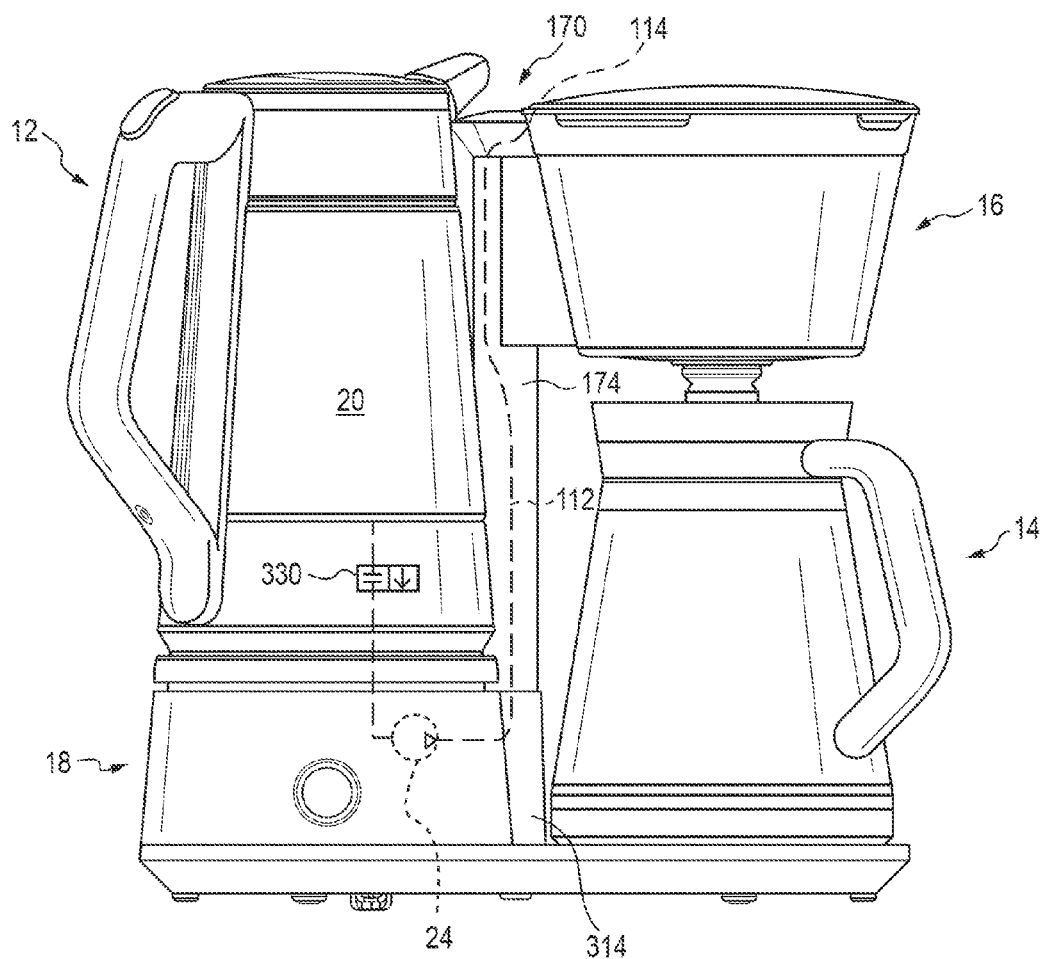
FIG. 12 is a perspective view of the hot beverage maker similar in all respects to the hot beverage maker depicted in FIG. 1 with the exception of the location of a pump, a pumped fluid conduit and a pumped fluid outlet.

The embodiments depicted in FIGS. 1-10 and in FIG. 11 depict the pumped fluid outlet 114 being selectively connectable with the pumped fluid outlet receptacle 170 to selectively provide heated water from the reservoir 20 to the brew basket assembly 16. In an alternative embodiment, the reservoir 20, which is shown as in the kettle 12 but could be another reservoir capable of holding several cups (at least about 1 liter or 2 liters) of water, can be selectively connectable with the pump inlet, an example of which is shown in FIG. 12. In such an embodiment, the hot beverage maker 10 includes a valve 340 (depicted schematically in FIG. 12) positioned upstream from the pump inlet of the pump 24, which can be located in the base 18 (as shown) or in the kettle like that shown in FIG. 4. The valve 340, which can be mechanical or electrically connected with the controller 320, selectively controls water flow from the reservoir 20 to the pump inlet. In this embodiment, the pumped fluid conduit 112 passes through the vertical support column 174 en route to the brew basket assembly 16. A tube similar to the main tube 116 can extend through the base 18, the column support 314 and the vertical support column 174 to a pumped fluid outlet receptacle 170' so that the pumped fluid outlet 114 is located in the pumped fluid outlet receptacle 170'. The pumped fluid outlet receptacle 170' is similar in configuration to the pumped fluid outlet receptacle 170 described above, but need not be configured to receive the spout 26 or the pumped water outlet structure 120.

Examples of a hot beverage maker, methods for making coffee and heating water and a method of determining a status of the hot beverage maker have been described above in particularity. Modifications and alterations will occur to those upon reading and understanding the preceding detailed description. The invention, however, is not limited to only the embodiments described above. Instead, the invention is broadly defined by the appended claims and the equivalents thereof. It will be appreciated that various of the above-disclosed and other features and functions, or alternatives or varieties thereof, may be desirably combined into many other different systems or applications. Moreover, features from one embodiment can be employed in other embodiments. Also that various presently unforeseen or unanticipated alternatives, modifications, variations or improvements therein may be subsequently made by those skilled in the art which are also intended to be encompassed by the following claims.

The invention claimed is:

1. A hot beverage maker comprising:
a pump including a pump inlet and a pump outlet;
a kettle including a reservoir, a heating element in the kettle for heating water in the reservoir, a spout for pouring water from the reservoir and a pump inlet opening for providing heated water from the reservoir to the pump inlet;
a pumped fluid conduit connected with the pump outlet, the pumped fluid conduit including a pumped fluid outlet; and
a brew basket assembly including a pumped fluid outlet receptacle and a brew basket, wherein the reservoir is selectively fluidly connectable with the brew basket via the pump inlet opening in the kettle being selectively fluidly connectable with the pump inlet or the pumped fluid outlet being selectively connectable with the pumped fluid outlet receptacle to selectively provide heated water from the reservoir to the brew basket.

2. The hot beverage maker of claim 1, wherein the pump is disposed in the kettle.

3. The hot beverage maker of claim 1, wherein the pumped fluid outlet receptacle includes a lid pivotally connected with a lower section to define a space for receiving the pumped fluid outlet, wherein the lid is pivotable with respect to the lower section.

4. The hot beverage maker of claim 3, wherein the pumped fluid conduit is at least partially disposed in the spout, wherein the pumped fluid outlet receptacle includes an opening through which the spout extends when received in the pumped fluid outlet receptacle and a movable flap at least partially covering the opening, wherein the flap is displaceable from an original position when contacted by the spout and returns toward the original position when no longer in contact with the spout.

5. The hot beverage maker of claim 1, wherein the reservoir includes a reservoir sidewall that defines the reservoir and a handle connected with the reservoir sidewall, wherein the pumped fluid conduit extends through the handle or along an exterior of the reservoir sidewall.

6. The hot beverage maker of claim 5, wherein the reservoir includes a reservoir base that in combination with the reservoir sidewall defines the reservoir, wherein the pump is in the kettle below the reservoir base, wherein the reservoir base is made from metal and is in contact with the heating element.

7. The hot beverage maker of claim 6, wherein the pump inlet opening extends through the base, and the kettle includes a main tube connected with the pump outlet, the main tube passing through the handle or along the exterior of the reservoir sidewall, wherein the main tube is at least a portion of the pumped fluid conduit.

8. The hot beverage maker of claim 7, wherein the kettle includes a top ring defining an upper opening that leads to the reservoir, wherein the top ring defines at least a portion of the spout, and the kettle further includes a pivoting lid selectively covering the upper opening, wherein the pumped fluid conduit passes around the upper opening within an internal space at least partially defined by the top ring.

9. The hot beverage maker of claim 8, wherein the kettle includes a pumped water outlet structure positioned in the spout, wherein the main tube connects with or is supported by the pumped water outlet structure, and the pump pumps water from the reservoir through the main tube and out through the pumped water outlet structure to deliver water to the brew basket.

10. The hot beverage maker of claim 9, wherein water being poured from the kettle through the spout passes beneath or around the pumped water outlet structure when exiting the kettle through the spout.

11. The hot beverage maker of claim 8, wherein the kettle includes a pumped water outlet structure positioned offset from the spout, wherein the main tube connects with or is supported by the pumped water outlet structure, and the pump pumps water from the reservoir through the main tube and out through the pumped water outlet structure to deliver water to the brew basket.

12. The hot beverage maker of claim 5, wherein the handle includes a spine positioned next to the reservoir sidewall, wherein the kettle includes main tube connected with the pump outlet positioned between the spine and the reservoir sidewall, wherein the main tube is at least a portion of the pumped fluid conduit.

13. The hot beverage maker of claim 1, further comprising a valve positioned upstream from the pump inlet to selectively control water flow from the reservoir to the pump inlet and a vertical support column for supporting the brew basket above an associated receptacle for receiving a brewed beverage, wherein the pumped fluid conduit passes through the vertical support column en route to the brew basket.

14. The hot beverage maker of claim 1, further comprising:
a base including a kettle support for supporting the kettle;
a controller disposed in the base;
a base electrical connector on the base configured to connect with a kettle electrical connector on the kettle when the kettle is placed on the kettle support, the base electrical connector being in electrical communication with the controller; and
a kettle sensor in communication with the controller, wherein the kettle sensor and the controller are configured such that if the pumped fluid outlet is not received in the pumped fluid outlet receptacle, then power is not delivered to the pump.

15. The hot beverage maker of claim 1, further comprising:
a base including a kettle support for supporting the kettle;
a controller disposed in the base;
a load cell disposed beneath the kettle support and in electrical communication with the controller, wherein the load cell measures a force being applied to the kettle support;
an input device in electrical communication with the controller, the input device being configured to receive operator commands for operating the hot beverage maker;
a base electrical connector on the base configured to connect with a kettle electrical connector on the kettle when the kettle is placed on the kettle support, the base electrical connector being in electrical communication with the controller.

16. A hot beverage maker comprising:
a pump including a pump inlet and a pump outlet;
a kettle including a reservoir, a heating element in the kettle for heating water in the reservoir, a spout for pouring water from the reservoir and a pump inlet opening for providing heated water from the reservoir to the pump inlet;
a pumped fluid conduit connected with the pump outlet, the pumped fluid conduit including a pumped fluid outlet; and
a brew basket assembly including a pumped fluid outlet receptacle and a brew basket, wherein the reservoir is selectively fluidly connectable with the brew basket via the pumped fluid outlet being selectively connectable with the pumped fluid outlet receptacle to selectively provide heated water from the reservoir to the brew basket, wherein the pumped fluid outlet receptacle includes a lid pivotally connected with a lower section to define a space for receiving the pumped fluid outlet.

17. A hot beverage maker comprising:
a pump including a pump inlet and a pump outlet;
a kettle including a reservoir, a heating element in the kettle for heating water in the reservoir, a spout for pouring water from the reservoir and a pump inlet opening for providing heated water from the reservoir to the pump inlet;
a pumped fluid conduit connected with the pump outlet, the pumped fluid conduit including a pumped fluid outlet at least partially disposed in the spout; and
a brew basket assembly including a pumped fluid outlet receptacle and a brew basket, wherein the reservoir is selectively fluidly connectable with the brew basket via the pumped fluid outlet being selectively connectable with the pumped fluid outlet receptacle to selectively provide heated water from the reservoir to the brew basket, wherein the pumped fluid outlet receptacle includes an opening through which the spout extends when received in the pumped fluid outlet receptacle.

18. A hot beverage maker comprising:

a pump including a pump inlet and a pump outlet;

a kettle including a reservoir, a heating element in the kettle for heating water in the reservoir, a spout for pouring water from the reservoir, a pump inlet opening for providing heated water from the reservoir to the pump inlet, a top ring defining an upper opening that leads to the reservoir, and a pivoting lid selectively covering the upper opening, wherein the top ring defines at least a portion of the spout;

a pumped fluid conduit connected with the pump outlet, the pumped fluid conduit including a pumped fluid outlet, wherein the pumped fluid conduit passes around the upper opening within an internal space at least partially defined by the top ring; and a brew basket assembly including a pumped fluid outlet receptacle and a brew basket, wherein the reservoir is selectively fluidly connectable with the brew basket via the pumped fluid outlet being selectively connectable with the pumped fluid outlet receptacle to selectively provide heated water from the reservoir to the brew basket.

* * * * *